United States Patent [19]

Kurosaki

[11] Patent Number: 5,125,505

[45] Date of Patent: Jun. 30, 1992

[54] CARD HOLDER

[75] Inventor: Mutsuo Kurosaki, Yokohama, Japan

[73] Assignee: Nifco Inc., Yokohama, Japan

[21] Appl. No.: 631,424

[22] Filed: Dec. 21, 1990

[30] Foreign Application Priority Data

Dec. 28, 1989 [JP] Japan .............................. 1-153049[U]

[51] Int. Cl.⁵ .............................................. B65D 83/12
[52] U.S. Cl. .................................... 206/39.4; 206/38; 206/39; 206/556; 206/449; 40/649
[58] Field of Search ................. 206/38, 39, 39.4, 39.5, 206/449, 454, 556; 40/649, 651, 652, 653, 654

[56] References Cited

U.S. PATENT DOCUMENTS

| | | | |
|---|---|---|---|
| 1,415,276 | 5/1922 | Terner | 206/39.5 |
| 3,710,929 | 1/1973 | Morales | 206/39.5 |
| 3,760,486 | 9/1973 | Rifkin et al. | 206/39.4 |
| 3,851,505 | 12/1974 | Wilkinson . | |
| 4,170,914 | 10/1979 | Carrier | 206/39.5 |
| 4,415,079 | 11/1983 | Ackeret | 206/556 |
| 4,450,955 | 5/1984 | Featherston | 40/649 |
| 4,473,154 | 9/1984 | Ackeret | 206/556 |
| 4,518,080 | 5/1985 | Ohlson | 206/39 |
| 4,697,698 | 10/1987 | Holdener . | |
| 4,792,058 | 12/1988 | Parker | 206/39.4 |
| 4,838,422 | 6/1989 | Gregerson | 206/449 |
| 4,843,221 | 6/1989 | Ohtsuki et al. . | |
| 4,852,727 | 8/1989 | Oberle | 206/39.4 |
| 4,931,622 | 6/1990 | Ohtsuki et al. . | |
| 5,020,255 | 6/1991 | Rodel | 206/39.5 |

Primary Examiner—David T. Fidei
Attorney, Agent, or Firm—Oliff & Berridge

[57] ABSTRACT

Disclosed herein is a card holder for holding a card. The card holder comprises a card holding member, a latch and an urging member disposed inside a card case body and a hook provided on one of first and second plate-like members of the card base body, characterized in that an inserted card is pressed against the urging force of an urging member so as to be held in a card accommodating position, and the card is further pressed from the card accommodating position so as to release the same from being held at the card accomodating position, thereby forcing out the card into a card insertion slot of a card case body by the urging force of the urging member.

20 Claims, 15 Drawing Sheets

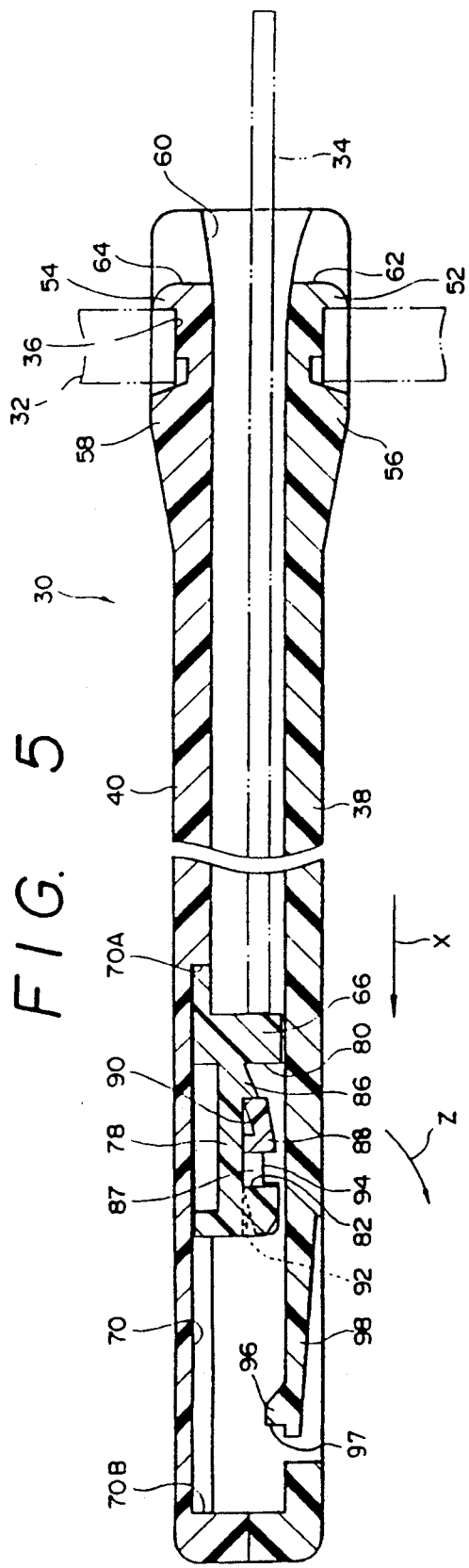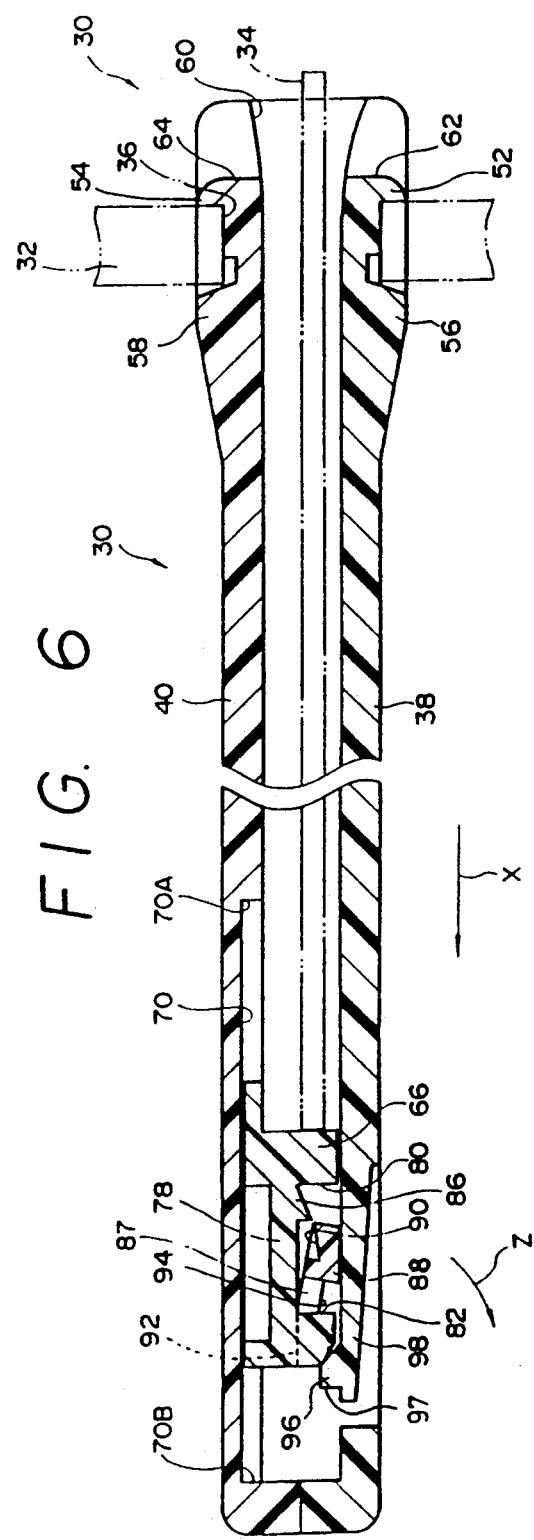

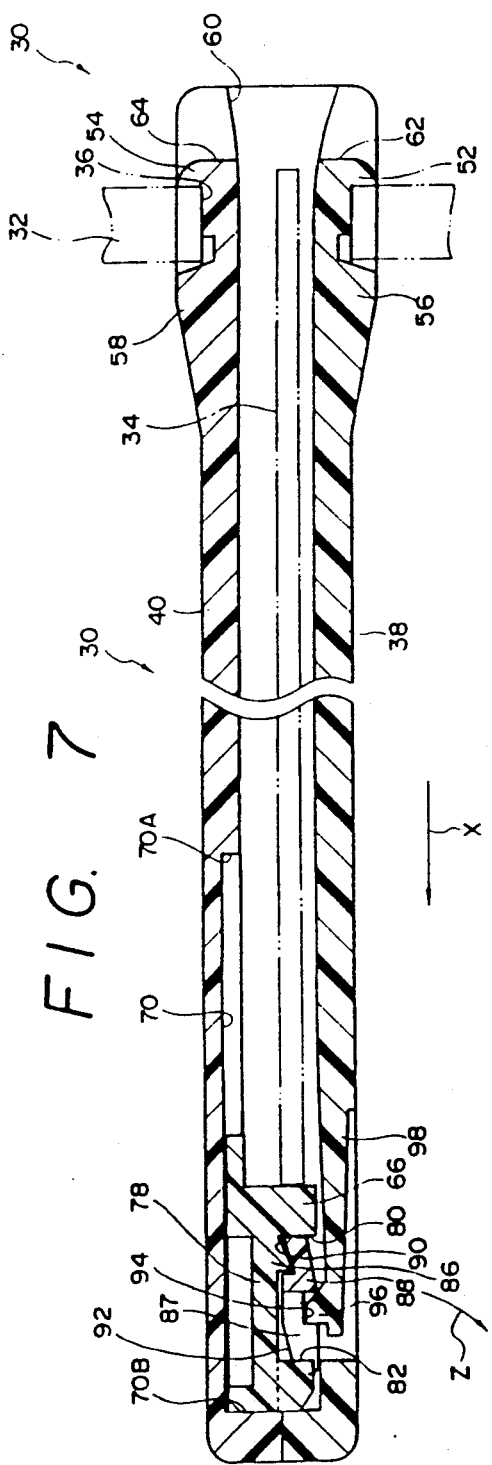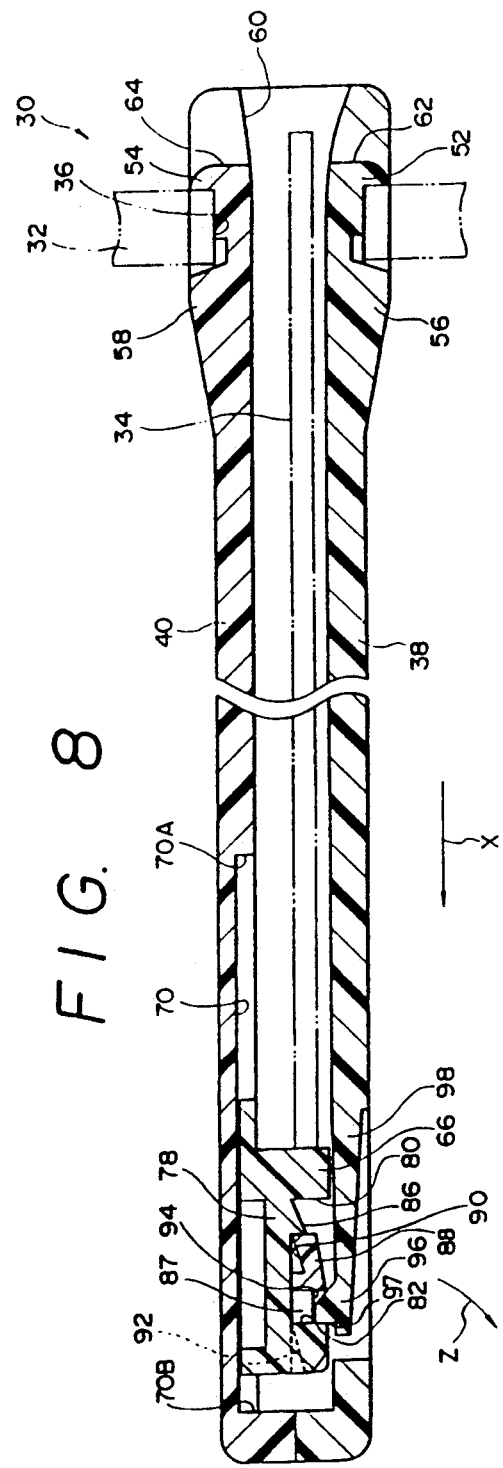

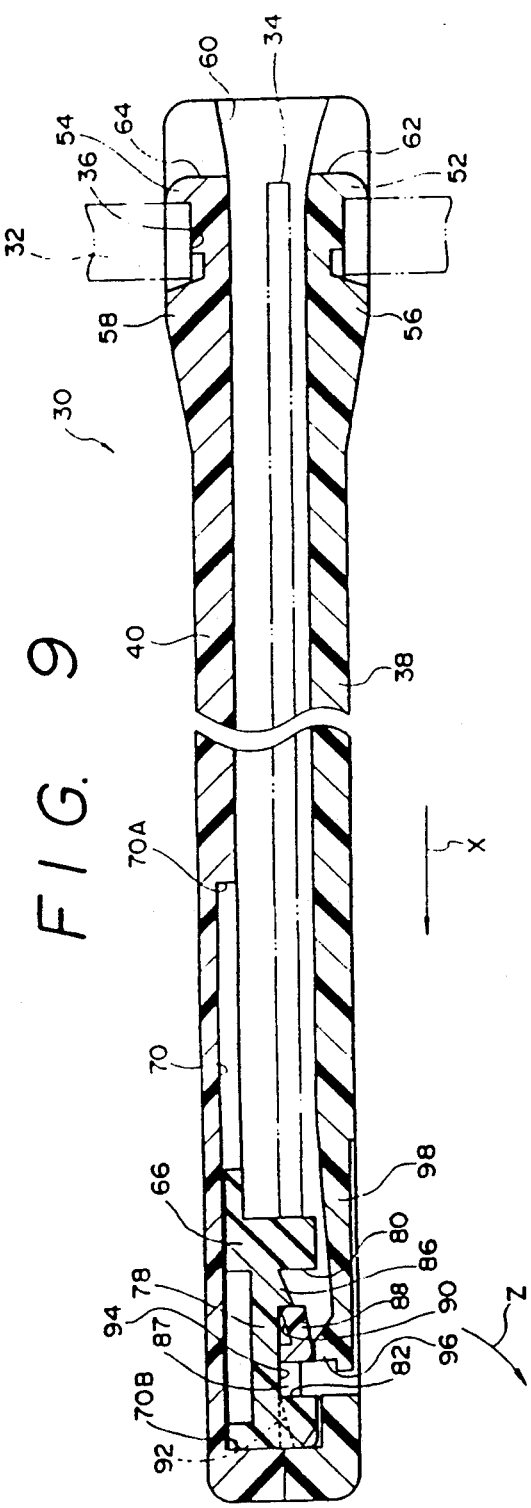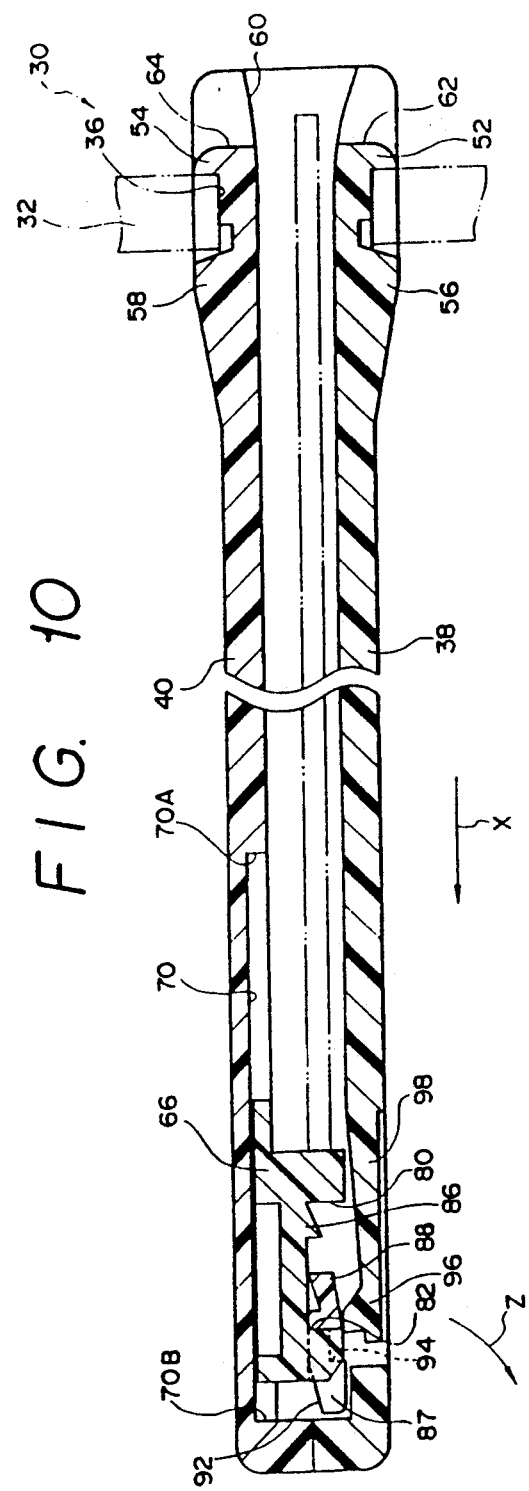

CARD HOLDER

BACKGROUND OF THE INVENTION

1) Field of the Invention:

The present invention relates to a card holder for holding therein a card such as a fuel credit card issued by a gas filling station, or the like.

2) Description of the Related Art:

FIGS. 17 and 18 show the structure of a conventional card case mounted on an interior wall or partition such as an installment panel of an automobile and used to accommodate a fuel card therein.

According to this structure, an opening/closing type cover 14 is supported on a case body 10 via a shaft 12 in such a manner that it can be opened and/or closed in the direction indicated by the arrow A. A fuel card 16 can be inserted into and pulled out of the case body 10 when the cover 14 is open. The case body 10 has a release button 18 mounted thereon so as to be operable under pressure and a locking hook 20 (shown in FIG. 17) formed integrally with the release button 18. When the cover 14 is closed from the open state of the cover 14, a hook 22 formed in the cover 14 is held in engagement with the locking hook 20 so as to prevent the cover 14 from opening inadvertently when it is in its closed state. The hook 22 is released from engagement with the locking hook 20 by the operation-under-pressure of the release button 18. When the release button 18 is pressed while the cover 14 is in the closed state, the hook 22 is released from engagement with the locking hook 20 so as to allow the cover 14 to open. A torsion coil spring 24 wound on the shaft 12 to urge the cover 14 in its opening direction is provided between the case body 10 and the cover 14. Upon opening of the cover 14, the hook 22 is released from being held in engagement with the locking hook 20. At the same time, the cover 14 is automatically opened by the urging force of the torsion coil spring 24.

However, the conventional card case has the problem that the opening and closing operations of the cover 14 are performed separately from the insertion and pulling-out operations of the fuel card 16, thus causing cumbersomeness of the operation at the time the fuel card 16 is inserted into the card case and/or pulled out therefrom. More specifically, even when the release button 18 is operated by pressing, before the fuel card 16 is pulled out of the card case, the fuel card 16 cannot be taken out of the card case later on unless one awaits the opening of the cover 14. In addition, when it is desired to accommodate the fuel card 16 in the card case, the fuel card 16 cannot be accommodated therein by merely inserting it into the card case, rather it is necessary to close the cover 14 after having inserted the card into the card holder.

SUMMARY OF THE INVENTION

With the foregoing problem in view, it is an object of the present invention to provide a card case of the type that a card such as a fuel card or the like can be easily inserted therein and/or pulled out therefrom.

The card case according to the present invention comprises card accommodating means for inserting the card therein and accommodating the same therein, card moving means provided in such a manner that the card can be moved between a card non-accommodating position and a card accommodating position in the card accommodating means and urging means for urging the card moving means toward the card non-accommodating position.

The card case further comprises locking means for locking the card moving means at the card accommodating position to thereby make the card stable in the card accommodating position when the card is pressed against the urging force of the urging means; and lock releasing means for releasing the card moving means from its locked state by pressing the card moving means at the card accommodating position to thereby make the card stable at the card non-accommodating position, i.e., a card withdrawal position.

In addition, a case body is attached to a mounting member for mounting the card holder.

A mounting slot is defined in the mounting member, and hooks to be inserted into the mounting slot and held in engagement therewith are formed integrally with the case body.

Clips to be held in engagement with the mounting member are detachably mounted on the case body, and the case body is selectively mounted on the mounting member with the clips or adhesive tape.

The card case is also provided with a covering member for covering all or a part of an opening defined in the case body.

According to the present invention having the above construction, when the card is inserted into the case body upon accommodating the same therein, a card forcing member is pressed by the card so as to be forced into the case body against the urging force of the urging means. Then, the forcing member is held in engagement with the case body by a latch at the card accommodating position, whereby the card is held in the case body.

When the forcing member is forced into the case body by the card forcing operation against the urging force of the urging means from the state in which the card has been accommodated in the case body, the forcing member is released from its engagement with the case body by means of the latch under this forcing operation, so that it is moved in a card pulling-out direction by the urging force of the urging means. As a consequence, the card is pressed by the forcing member under this movement so as to be moved in the card pulling-out direction, thereby making it possible to take out the card from the case body.

Accordingly, the card can be accommodated in the case body by simply inserting the same therein upon accommodating the card therein. On the other hand, the card can be taken out from the case body by simply forcing the same therein upon taking out the card. Thereafter, one can take out the card from the case body by simply pulling out the card therefrom.

Further, the case body can be widely adopted not only as a portable device but also as a fitment attached to the interior of an automobile or a carrying bag if the case body is mounted on a member to be mounted such as the interior of the automobile or the carrying bag. In this case, if a mounting slot is defined in the mounting member and an engagement means inserted into the mounting slot of the mounting member and held in engagement therewith is formed integrally with the case body, the case body can easily be mounted on the mounting member by the simple assembling work. In addition, if the clips used to be held in engagement with the mounting member are detachably mounted on the case body and the case body is selectively attached to the mounting member by either clips or adhesive tape, the case body may be conveniently attached to the mounting member at any time after production.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIGS. 1 through FIGS. 12 are diagrams showing a first embodiment of a card holder according to the present invention, in which:

FIG. 1 is an exploded perspective view of the embodiment;

FIG. 2 is a perspective view depicting a part of components of a case body shown in FIG. 1 as seen from a direction opposite to that depicted in FIG. 1;

FIGS. 3 and 4 are plan views each illustrating the manner of operation at the time that a card is held in the card holder or taken out therefrom;

FIGS. 5 through 10 are cross-sectional views each illustrating the manner of operation at the time that the card is accommodated in the card holder until it is taken out therefrom;

FIG. 11 is a cross-sectional view illustrating the manner in which the case body is mounted; and FIG. 12 is a perspective view showing a part of components provided inside the case body as seen from a direction opposite to that shown in FIG. 1;

FIGS. 13 through 15 show another embodiment, in which:

FIG. 13 is an exploded perspective view illustrating a second embodiment shown in association with the first embodiment in FIG. 1;

FIGS. 14 and 15 are cross-sectional views each depicting the manner in which a case body is mounted.

FIGS. 17 and 18 show the structure of a conventional card holder, in which:

FIG. 17 is a cross-sectional view of the card holder; and

FIG. 18 is a perspective view of the card holder.

DETAILED DESCRIPTION OF THE PREFERRED EMBODIMENTS

FIGS. 1 through 12 and FIG. 16 each show a card case 30 to which the present invention is applied.

Figure 1:
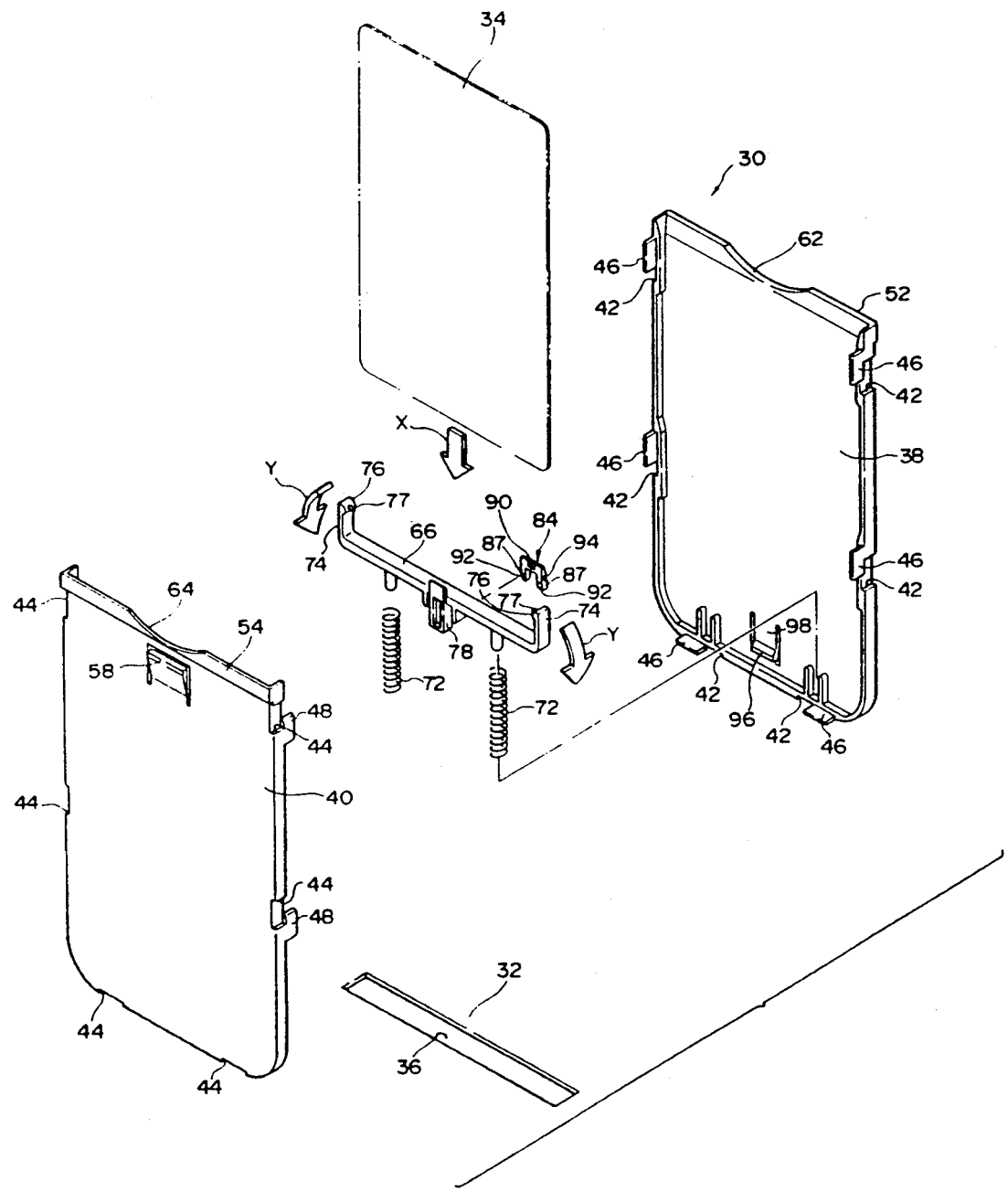
Figure 11:
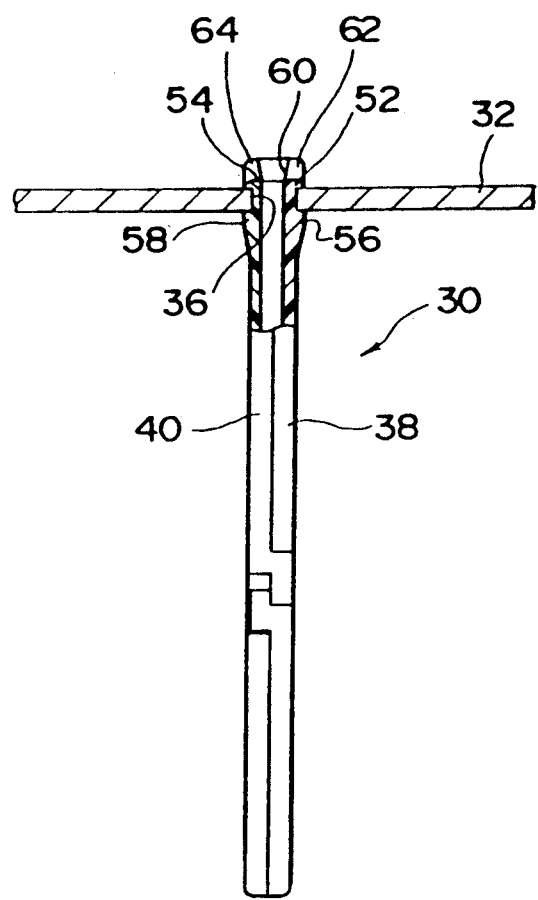

As shown in FIG. 11, the card case 30 is used to accommodate a fuel credit card 34 (shown in FIG. 1) therein, which is mounted on a laterally-formed wall, i.e., a horizontal partition or wall 32 formed in the interior of an automobile and which is issued by a filling gas station. The horizontal wall 32 has a narrow and rectangular mounting slot 36 defined therethrough as shown in FIG. 1. A case body of the card case 30 is inserted into the mounting slot 36 from the position as seen upwardly from the surface of the horizontal wall 32. The mounting slot 36 is defined in the form of a narrow rectangle as depicted in FIG. 1.

As shown in FIG. 1, the case body is comprised of two rectangular plate-like members 38 and 40 are held in engagement with each other in a superposed state so as to be formed in the form of a thin and rectangular case. Thus, the fuel card 34 can be contained inside the case body. The rectangular plate-like members 38 and 40 have recesses 42, 44 defined therein at six points over the peripheral walls thereof, respectively. In addition, they also have hooks 46, 48 formed therein adjacent to the respective recesses 42, 44. The rectangular plate-like members 38 and 40 are superposed on each other so as to fit the hooks 48, 46 provided in an opposing relationship to the recesses 42, 44 respectively therein. Thus, the hooks 48, 46 are held in engagement with their corresponding recesses 42, 44 in a superposed state (see FIG. 2 regarding the recess 44 and the hook 48).

As shown in FIG. 11, the case body has flanges 52, 54 formed around the outer periphery thereof, i.e., formed on the upper edges of the rectangular plate-like members 38, 40 and these flanges are brought into close association with the edge surfaces (an upper surface shown in FIG. 11) of the periphery of the mounting slot 36 defined in the horizontal wall 32. In addition, the rectangular plate-like members 38, 40 have hooks 56, 58 formed thereon in an opposing relationship to the flanges 52, 54. The case body is securely fixed to the horizontal wall 32 with the peripheral areas of the mounting slot 36 of the horizontal wall 32 interposed between the hooks 56, 58 and the flanges 52, 54, respectively. The flanges 52, 54 are formed over the transverse-direction entire areas of the respective rectangular plate-like members 38, 40 (see FIG. 1). The flanges 52, 54 are also joined to the surface (the upper surface shown in FIG. 11) representative of the mounting slot 36 of the horizontal wall 32 over the wide areas. The hooks 56, 58 are provided at the transverse-direction intermediate portions of the respective rectangular plate-like members 38, 40 (see FIG. 1). Upon inserting the case body into the mounting slot 36, the case body is brought into contact with an inner peripheral edge of the mounting slot 36 so as to extend through the mounting slot 36 while the rectangular plate-like members 38, 40 are being elastically deformed in the direction in which they approach each other. After the case body has extended through the mounting slot 36, the peripheral areas of the mounting slot 36 of the horizontal wall 32 are interposed between the flanges 52, 54 by the form recovery of the rectangular plate-like members 38, 40. Incidentally, although the hook 56 is not shown in FIG. 1, it is provided at an intermediate position along the width of the upper end portion of the rectangular plate-like member 38 in the same manner as the hook 58 is provided on the plate-like member 40.

As shown in FIG. 11, the case body has a narrow opening 60 defined therethrough over the outer periphery thereof as seen upwardly (upwardly as viewed in FIG. 11) from the surface of the horizontal wall 32 (see FIG. 1). The fuel card 34 can be inserted inwardly between the rectangular plate-like members 38, 40 through the opening 60 from the position as seen upwardly from the surface of the horizontal wall 32. The rectangular plate-like members 38, 40 defining the opening 60 have upper end faces thereof formed with arcuate cuts 62, 64 defined in the lengthwise intermediate portions of the rectangular plate-like members 38, 40 and provided in an opposing relationship to each other as shown in FIG. 1. The fuel card 34 can be inserted deeply into the interior between the rectangular plate-like members 38, 40 by pushing the same from the positions where the cuts 62, 64 are defined.

In addition, the case body has a holder 66 disposed therein slidably along a passage for the insertion of the fuel card 34 as shown in FIG. 5.

Figure 2:
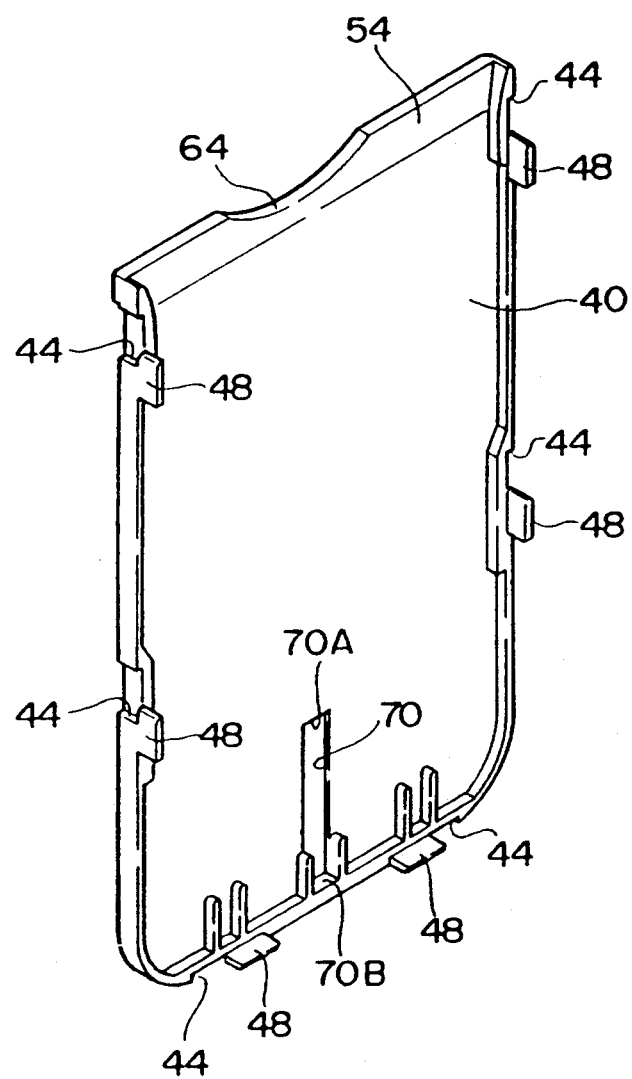

The holder 66 is slidably fitted in a guide groove 70 shown in FIG. 2 defined in an inner wall of the rectangular plate-like member 40 along the direction in which the fuel card 34 is to be inserted into the case body and pulled out therefrom. In addition, the holder 66 is slidable in the direction in which the fuel card 34 is to be inserted therein and/or pulled out therefrom over the distance between the position (shown in FIG. 5) where the holder 66 is brought into contact with the upper peripheral edge 70A of the guide groove 70 positioned at the end of the direction in which the fuel card 34 is to be pulled out and the position (shown in FIGS. 7 and 9) where the holder 66 is brought into contact with the lower peripheral edge 70B of the guide groove 70 positioned on the side of the direction in which the fuel card 34 is to be inserted. Incidentally, the guide groove 70 is defined over the length of a region between the intermediate portion of the rectangular plate-like member 40 positioned on the side of the direction in which the fuel card 34 is to be inserted and the innermost wall of the rectangular plate-like member 40 positioned on the side of the direction in which the fuel card 34 is to be inserted.

Figure 3:
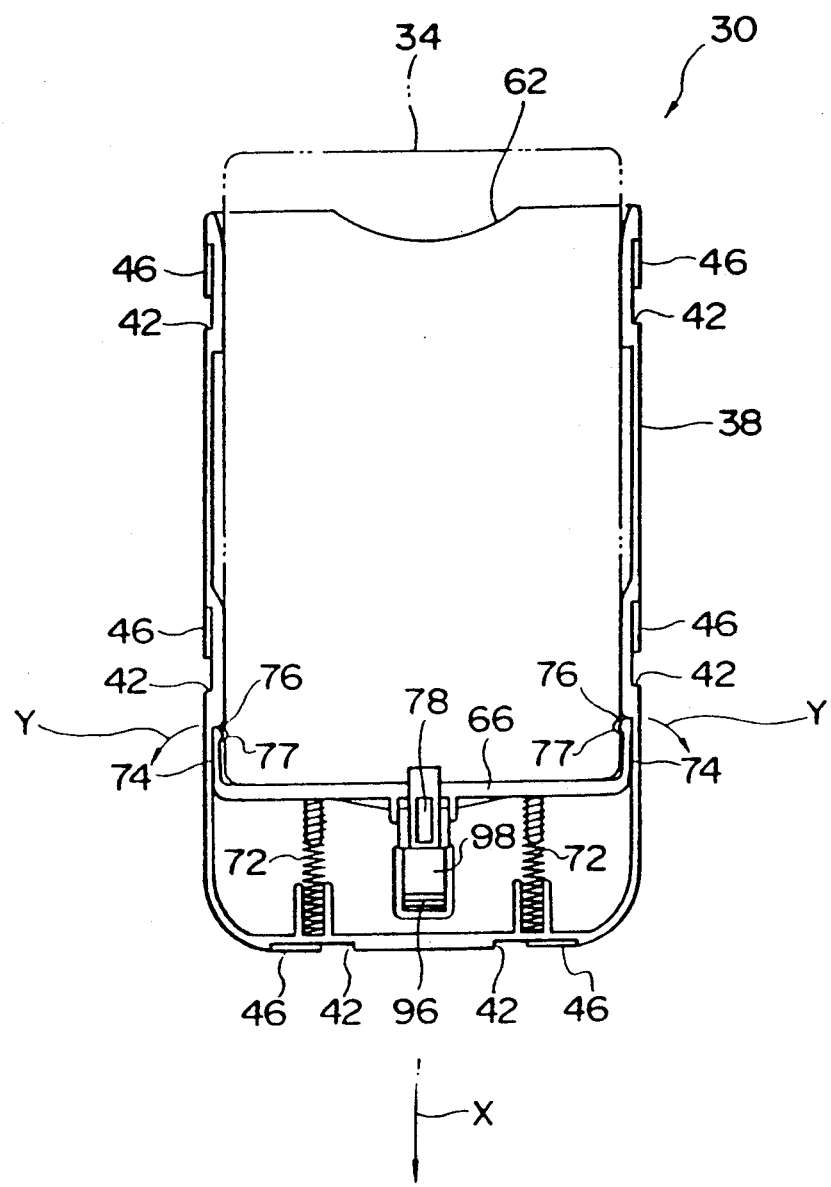

As shown in FIGS. 1 and 3, a pair of compression coil springs 72 are disposed in the innermost part of the holder 66 positioned on the side of the direction in which the fuel card 34 is to be inserted. The holder 66 is urged by the compression coil springs 72 in the direction in which the fuel card 34 is to be pulled out. Upon receipt of this urging force, the holder 66 is maintained, in a free state, i.e., in a state in which the fuel card 34 is not inserted, at the position (the position shown in FIG. 5) where the holder 66 is brought into contact with the upper peripheral edge 70A of the guide groove 70 located on the side of the direction in which the fuel card 34 is to be pulled out. When the holder 66 is in a state where it has been brought into contact with the upper peripheral edge 70A of the guide groove 70 positioned on the side of the direction in which the fuel card 34 is to be pulled out, the fuel card 34 is brought into contact with the holder 66 in a fuel-card insertion position, where it substantially extends out from the inside of the case body, as shown in FIG. 5. Upon inserting the fuel card 34 into the case body, the holder 66 is pressed by the fuel card 34 against the urging force of the compression coil springs 72 so as to be forced completely into the case body.

As shown in FIG. 1, the holder 66 is formed in the shape of an inverted U-shape frame. As illustrated in FIG. 3, an end portion of the fuel card 34 positioned on the insertion-direction side thereof is brought into contact with the intermediate portion between both legs 74 with the fuel card 34 interposed therebetween, so that the holder 66 is forced in the card insertion direction.

The two legs 74 have tip portions thereof formed with protrusions 76 which extend out along the insertion passage for the fuel card 34. The protrusions 76 are brought into contact with the end portion of the fuel card 34 positioned on the insertion-direction side thereof (the direction indicated by the arrow X) upon insertion of the fuel card 34 so as to flex the two legs 74 in the direction (the direction indicated by the arrow Y) in which they are moved away from each other. Thus, the fuel card 34 can be held by the resilient forces of the two legs 74 from the transverse direction thereof in a state in which the fuel card 34 is brought into contact with the intermediate portion of holder 66 between the two legs 74. Incidentally, pressing shaft 77, which are brought into contact with the front or reverse side of the fuel card 34, extend out from the tip portions of the protrusions 76 so as to restrict the movement in the direction of thickness of the fuel card 34 in the inserted state.

Figure 12:
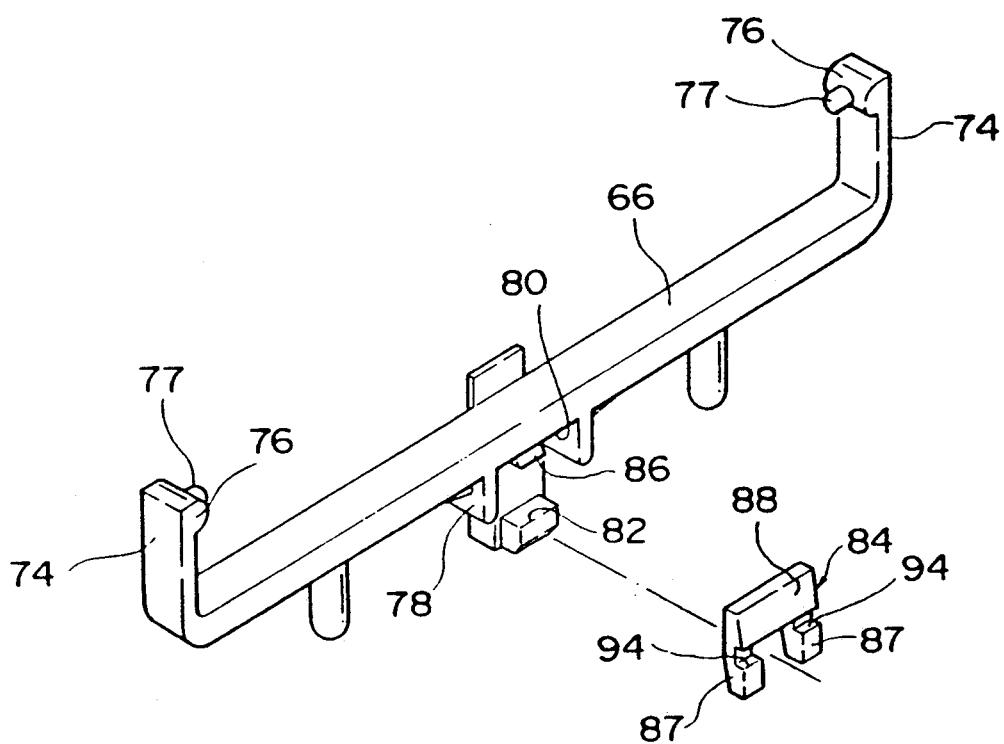

As shown in FIG. 12, a block-shaped portion 78 is formed in the intermediate portion of holder 66 between the two legs 74. As depicted in FIG. 1, the block-shaped portion 78 extends out from the intermediate portion between the two legs 74 in the direction (indicated by the arrow X) in which the fuel card 34 is to be inserted. The holder 66 is slidable in the direction in which the fuel card 34 is to be inserted, until the block-shaped portion 78 is brought into contact with the lower peripheral edge 70B of the guide groove 70 positioned on the end of the groove 70 in the direction in which the fuel card 34 is to be inserted.

As illustrated in FIG. 12, the block-shaped portion 78 has stepped portions 80, 82 formed at respective ends of a portion thereof facing the rectangular plate-like member 38 in an opposing relationship. Stepped portion 82 is on the end of this facing portion in the direction in which the fuel card 34 is to be inserted, and stepped portion 80 is on the end of this facing portion which is in the direction in which the fuel card 34 is to be withdrawn. When the fuel card 34 is fully inserted that is, when the whole fuel card 34 is accommodated inside the case body, the case body is held in engagement with the stepped portion 82, whereby the fuel card 34 is held in the case body.

Described more specifically, the rectangular plate-like member 38 is formed with a hook 96 in association with the block-shaped portion 78. As shown in FIG. 8, a stepped portion 97 of the hook 96 is held in interlock with the stepped portion 82 at the inserted position where the substantial overall fuel card 34 is contained in the case body, thereby preventing the holder 66 from being moved in the direction in which the fuel card 34 is to be pulled out. As a consequence, the substantial overall fuel card 34 is accommodated in the case body, thereby resulting in a state in which the fuel card 34 is contained completely therein. The hook 96 is formed in the rectangular plate-like member 38 by way of a flexible leaf 98 so as to be held in engagement with the stepped portion 82 by the resilient force of the flexible leaf 98. In addition, the hook 96 is released from engagement with the stepped portion 82 by the elastic deformation of the flexible leaf 98 as shown in FIG. 10.

In the state in which the fuel card 34 has been accommodated in the case body, a part of the fuel card 34 is exposed to the outside from the cuts 62, 64 of the case body and the block-shaped portion 78 is positioned at the intermediate portion of the guide groove 70 as shown in FIG. 8. In addition, even from the state in which the fuel card 34 has already been contained in the case body, the fuel card 34 is forced into the card body from the cuts 62, 64 until the block-shaped portion 78 is brought into contact with the lower peripheral edge 70B of the guide groove 70 positioned on the side of the groove 70 in the fuel-card insertion direction.

The block-shaped portion 78 has a latch cam 84 movably mounted between the stepped portions 80, 82 relative to the direction in which the fuel card 34 is to be inserted into or pulled out from the case body. In addition, a triangle-shaped protrusion 86 is formed between the stepped portions 80, 82 and serves to restrict the movement of the latch cam 84. The triangle-shaped protrusion 86 slidably moves the latch cam 84 from the position where it is brought into contact with the stepped portion 80 positioned on the side of the direction in which the fuel card is to be pulled out to the position where it is brought into contact with the stepped portion 82 positioned on the side of the direction in which the fuel card is to be inserted, along the direction (indicated by the arrow X in FIG. 3) in which the fuel card 34 is to be inserted. When the latch cam 84 is moved in the direction opposite to the fuel-card insertion direction (the direction opposite to the direction indicated by the arrow X), the triangle-shaped protrusion 86 is brought into contact with the latch cam 84 in the course of its movement, thereby preventing the latch cam 84 from being moved.

As shown in FIG. 12, the latch cam 84 has a planar structure made in the form of a substantially inverted U shape. The intermediate portion between the two legs 87 of the latch cam 84 is positioned between the stepped portions 80, 82 of the block-shaped portion 78. The two legs 87 span the stepped portion 82 of the block-shaped portion 78 and the triangle-shaped protrusion 86 and are positioned on either side of both the stepped portion 82 and the triangle-shaped protrusion 86. The intermediate portion between the two legs 87 is in substantially the same plane with the top surface of the stepped portion 82 in a state in which it is brought into contact with the stepped portion 82 as shown in FIG. 10.

The latch cam 84 has a notch-shaped groove 90 defined in a top portion of latch cam 84 corresponding to an end portion of the latch cam 84 positioned on the fuel-card pulling-out direction side, the portion being faced in an opposing relationship to the block-shaped portion 78 as shown in FIG. 5. When the latch cam 84 is in the state in which it is brought into contact with the stepped portion 80 of the block-shaped portion 78, the triangle-shaped protrusion 86 of the block-shaped portion 78 fits into the notch-shaped groove 90 as illustrated in FIG. 7. In addition, the latch cam 84 has slanted surfaces 92 formed in leg portions corresponding to end portions of both legs 87 positioned on the fuel-card insertion direction side, slanted surface 92 of the leg portions being faced in an opposing relationship to the block-shaped portion 78. The top portion is swingably moved so as to rotate latch cam 84 in the direction indicated by the arrow Z until the flat surface of the block-shaped portion 78 is brought into contact with the slanted surfaces 92 as shown in FIG. 6. Thus, the latch cam 84 is enabled to get over the triangle-shaped protrusion 86 so as to be moved in the fuel card pulling-out direction (the direction opposite to the direction indicated by the arrow X) from the position where it is brought into contact with the stepped portion 82 to the position where it is brought into contact with the stepped portion 80.

In addition, as shown in FIG. 12, the latch cam 84 has engagement grooves 94 defined near bases of the two legs 87. As illustrated in FIGS. 5 and 7, the engagement grooves 94 are positioned between the position where the intermediate portion between the two legs 87 of the latch cam 84 is brought into contact with the triangle-shaped protrusion 86 of the block-shaped portion 78 and the position where the intermediate portion between the two legs 87 is brought into contact with the stepped portion 80 of the block-shaped portion 78, namely, they are located between the triangle-shaped protrusion 86 and the stepped portion 80. The hook 96 of the rectangular plate-like member 38 can be fitted in the engagement grooves 94 as shown in FIG. 7.

A description will now be made of the operation of the present embodiment.

As shown in FIG. 11, the card case 30 is securely fixed to the horizontal wall 32 by inserting the card body into the mounting slot 36 from above surface of the horizontal wall 32 in the interior of the automobile. The card case 30 is also used to accommodate the fuel card 34 therein.

Upon inserting the case body into the mounting slot 36 in the horizontal wall 32, the hooks 56, 58 are brought into contact with the inner peripheral edge of the mounting slot 36 so as to extend through the mounting slot 36 while the rectangular plate-like members 38, 40 are being elastically deformed in the direction in which they approach each other. After the case body has extended through the mounting slot 36, the hooks 56, 58 serve to interpose the peripheral areas of the mounting slot 36 of the horizontal wall 32 between the flanges 52, 54 by the form recovery of the rectangular plate-like members 38, 40. As a result, the card case 30 is securely fixed to the horizontal wall 32.

When the fuel card 34 is in a non-inserted state, the holder 66 is held, by the urging force caused by the compression coil springs 72, at the position (illustrated in FIG. 5) where the block shaped portion 78 is brought into contact with the upper peripheral edge 70A of the guide groove 70 positioned on the side of the direction in which the fuel card is to be pulled out. The latch cam 84 is provided slidably along the fuel card insertion and pulling-out directions between the stepped portion 82 of the block-shaped portion 78 formed in the holder 66 and the triangle-shaped protrusion 86.

When the fuel card 34 is accommodated in the card case 30, it is brought into contact with the holder 66 at the inserted position where the fuel card 34 substantially extends out from the inside of the case body as shown in FIG. 5. In addition, the holder 66 is pressed against the urging force of the compression coil springs 72 by the fuel card 34 when the card is pressed. Then, the holder 66 passes through the position (illustrated in FIG. 8) where it is held in engagement with the case body so as to be forced into the maximum forced position, i.e., the position where the block-shaped portion 78 is brought into contact with the lower peripheral edge 70B of the guide groove 70 positioned on the side of the direction in which the fuel card 34 is to be inserted.

More specifically, the hook 96 of the rectangular plate-like member 38 is brought into contact with tip portions of the two legs 87 of the latch cam 84 by forcing the holder 66 toward the maximum forced position, so that the latch cam 84 is pressed in the direction in which the fuel card is to be pulled out (direction opposite to the direction indicated by the arrow X). As a consequence, the holder 66 is positioned at the position (see FIG. 5) where latch cam 84 is brought into contact with the triangle-shaped protrusion 86 of the block-shaped portion 78. Then, the triangle-shaped protrusion 86 serves to restrict the sliding movement of the latch cam 84 in the direction in which it is to be brought into contact with the stepped portion 80. Thus, the tip portions of the two legs 87 of the latch cam 84 are pressed toward the flat surface of the block-shaped portion 78 by means of the slanted surface of the hook 96 (see FIG. 6). Then, the latch cam 84 is swung in the direction indicated by the arrow Z as shown in FIG. 6 until the slanted surfaces 92 of the latch cam 84 are brought into contact with the flat surface of the block-shaped portion 78 by the produced pressing force.

Then, the latch cam 84 gets over the triangle-shaped protrusion 86 by this swinging operation. Thereafter, the hook 96 of the rectangular plate-like member 38 is continuously brought into contact with the tip portions of the two legs 87 formed in the latch cam 84 to thereby force the latch cam 84 in the direction in which the fuel card 34 is to be pulled out (direction opposite to the direction indicated by the arrow X). Thus, the latch cam 84 is moved so as to be brought into contact with the stepped portion 80 of the block-shaped portion 78, followed by forcing the holder 66 in the fuel-card insertion direction.

The hook 96 of the rectangular plate-like member 38 gets over the stepped portion 82 of the block-shaped portion 78 by this forcing operation. Thus, the hook 96 is brought into sliding contact with the tip portions of the two legs 87 of the latch cam 84. Therefore, the hook 96 is no longer held in engagement with the stepped portion 82 of the block-shaped portion 78 at the position where the holder 66 is engaged with the case body (shown in FIG. 8). As a consequence, the holder 66 passes through the position where it is held in engagement with the case body so as to be forced into the maximum forced position where it is brought into contact with the lower peripheral edge 70B of the guide groove 70 positioned on the side of the direction in which the fuel card 34 is to be inserted.

The latch cam 84 is brought into contact with the stepped portion 80 of the block-shaped portion 78 as shown in FIG. 7 at the maximum forced position where the holder 66 is brought into contact with the lower peripheral edge 70B of the guide groove 70 positioned on the side in the direction in which the fuel card 34 is to be inserted. In addition, the engagement grooves 94 of the latch cam 84 are positioned between the triangle-shaped protrusion 86 and the stepped portion 80 so that the hook 96 of the rectangular plate-like member 38 is fitted in the engagement grooves 94 of the latch cam 84 by the resilient force of the flexible leaf 98.

When the insertion pressure of the fuel card 34 into the card case stops, the holder 66 is forced back by the urging force of the compression coil spring 72. Upon this return movement, the latch cam 84 is moved relatively together with the holder 66 as the hook 96 of the rectangular plate-like member 38 is fitted in the engagement grooves 94. The hook 96 of the rectangular plate-like member 3 is held in engagement with the stepped portion 82 of the block-shaped portion 78 at the position where the holder 66 is slightly forced back from the maximum forced position by this relative movement, as shown in FIG. 8. At this position where the hook 96 and stepped portion 82 are held in engagement with each other, the latch cam 84 is positioned between the stepped portion 82 of the block-shaped portion 78 and the triangle-shaped protrusion 86.

Thus, the holder 66 is held in the case body at the inserted position where the substantial overall fuel card 34 is accommodated in the case body, by holding the hook 96 in engagement with the stepped portion 82. As a consequence, the fuel card 34 is completely received in the case body.

Figure 4:
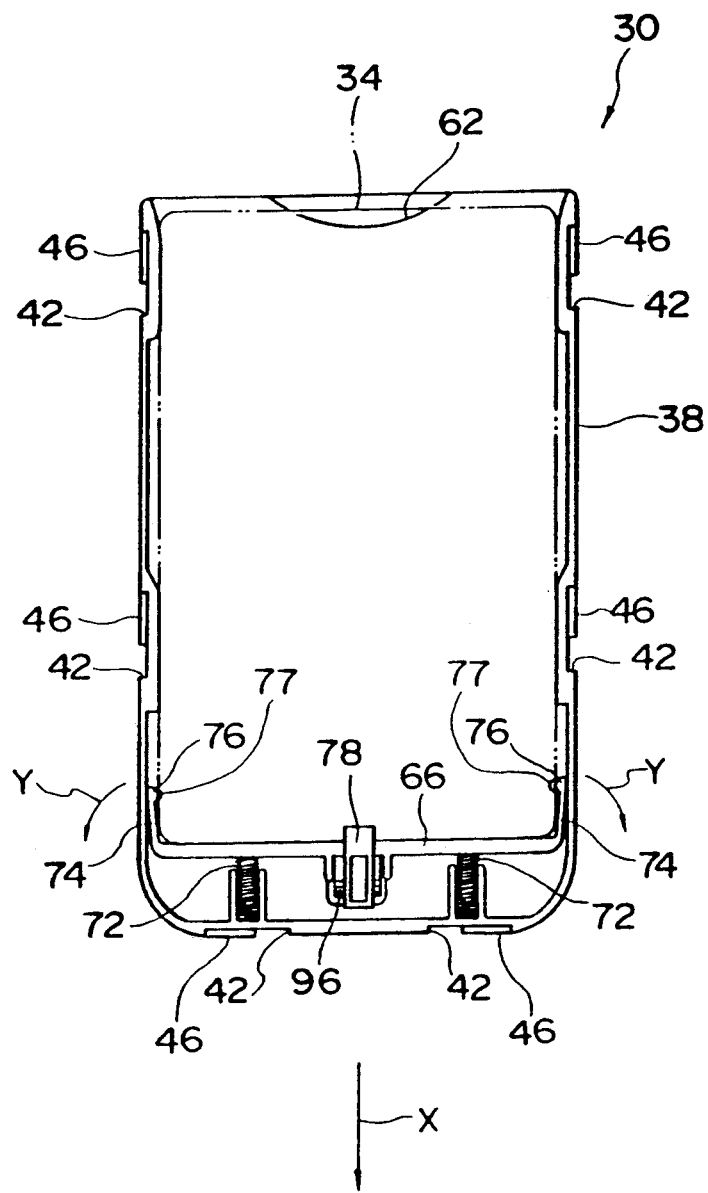

In the state in which the fuel card 34 is accommodated in the case body, as shown in FIG. 4, the end portion of the fuel card 34 positioned on the insertion-direction side thereof is brought into contact with the intermediate portion between the two legs 74 after passing the same between the two legs 74 of the holder 66, whereby the fuel card 34 is held by the resilient force of the two legs 74 from the transverse direction through the protrusions 76. Namely, upon holding the fuel card 34 in the case body, the fuel card 34 is brought into contact with the protrusions 76 of the two legs 74 so as to flex the two legs 74 in the direction (indicated by the arrow Y) in which they are moved away from each other, and the fuel card 34 is forced into the case body along with the holder 66 which is forced into the maximum forced position in the state in which the end portion of the fuel card 34 is brought into contact with the intermediate portion between the two legs 74. This state is maintained continuously even in the state in which the fuel card 34 is accommodated in the case body, and hence the fuel card 34 is held by the resilient force of the two legs 74 in a transverse direction through the protrusions 76.

Accordingly, the fuel card 34 is no longer shaken in the state in which it is contained in the case body.

When it is desired to take out the fuel card 34 from the case body, it is only necessary to push it further into the case body. Thus, the holder 66 is forced into the maximum forced position by this forcing operation. Then, as fuel card 34 is pressed into the holder 66 in the card insertion direction, the latch cam 84 is pressed by the triangle-shaped protrusion 86 under this forcing operation and then moved together with the holder 66. As a consequence, when the holder 66 reaches the maximum forced position, the hook 96 of the rectangular plate-like member 38 is pressed by a raised portion 88 of the latch cam 84 as shown in FIG. 9 so as to be extracted from the engagement grooves 94 of the latch cam 84, thereby releasing the hook 96 of the rectangular plate-like member 38 from being held in engagement with the stepped portion 82 of the holder 66.

When the forcing of the fuel card 34 into the case body stops, the holder 66 is forced back from the maximum forced position to the original position (position shown in FIG. 5 where the holder 66 is brought into contact with the upper peripheral edge 70A of the guide groove 70 on the end of the groove 70 in the direction in which the fuel card 34 is to be pulled out) by the urging force of the compression coil springs 72 after passing the position (position illustrated in FIG. 8) where the holder 66 is held in engagement with the case body. Then, the fuel card 34 is in turn pressed by the holder 66 which is being forced back, until the fuel card 34 is forced back into the position illustrated in FIG. 5. As a consequence, the fuel card 34 can easily be taken out of the case body by simply pulling it out, against the clamping force of the protrusions 76.

Namely, when the forcing of the fuel card 34 into the case body stops, the holder 66 is forced back by the urging force of the compression coil springs 72. Under this forced return movement, the stepped portion 82 of the block-shaped portion 78 is brought into contact with the latch cam 84 as shown in FIG. 10 while the frictional force produced between the raised portion 88 of latch cam 84 and the hook 96 of the rectangular plate-like member 38 fixes the latch cam 84 in one place. Thus, the intermediate portion between the two legs 87 of the latch cam 84 forms a continuous surface with the top surface of the stepped portion 82 of the block-shaped portion 78 (see FIG. 10). As a result, since it is impossible for the hook 96 of the rectangular plate-like member 38 to re-engage the engagement grooves 94 of latch cam 84 and be held in engagement with the stepped portion 82 of the block-shaped portion 78 while the holder 66 is being moved in the card pulling out direction, then the holder 66 is forced back into the original position by compression coil springs 72. When the holder 66 is as the original position, the fuel card 34 is sufficiently extended out from the inside of the case body as shown in FIG. 5, so that it can be taken out.

Accordingly, when it is desired to accommodate the fuel card 34 in the case body, it can be contained in the case body by simply inserting the same therein. On the other hand, when it is desired to take out the fuel card 34 from the case body, it can be taken out by simply forcing the same into the case body. Thereafter, the fuel card 34 can be taken out only by pulling it out of the case body.

Figure 13:
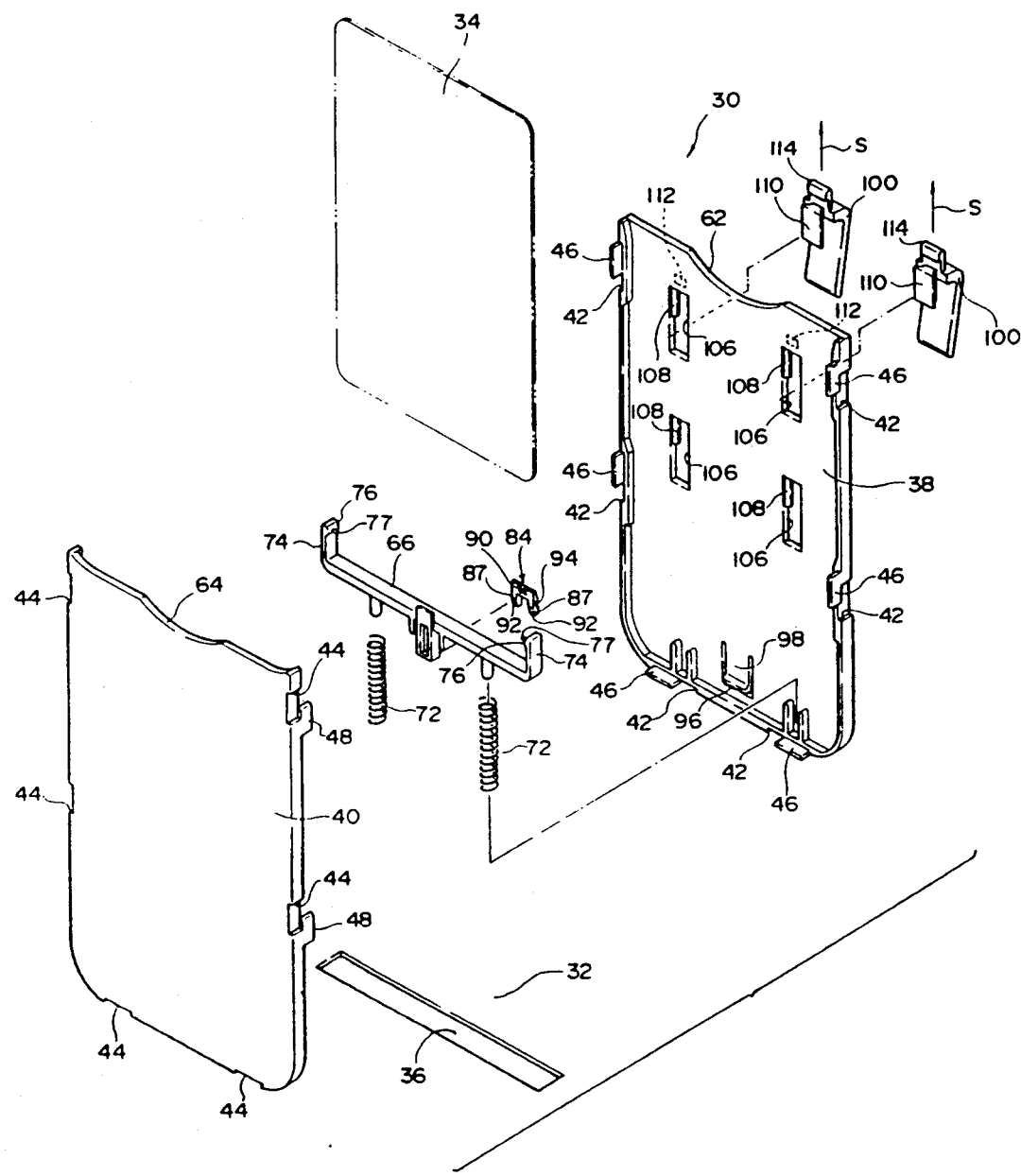
Figure 14:
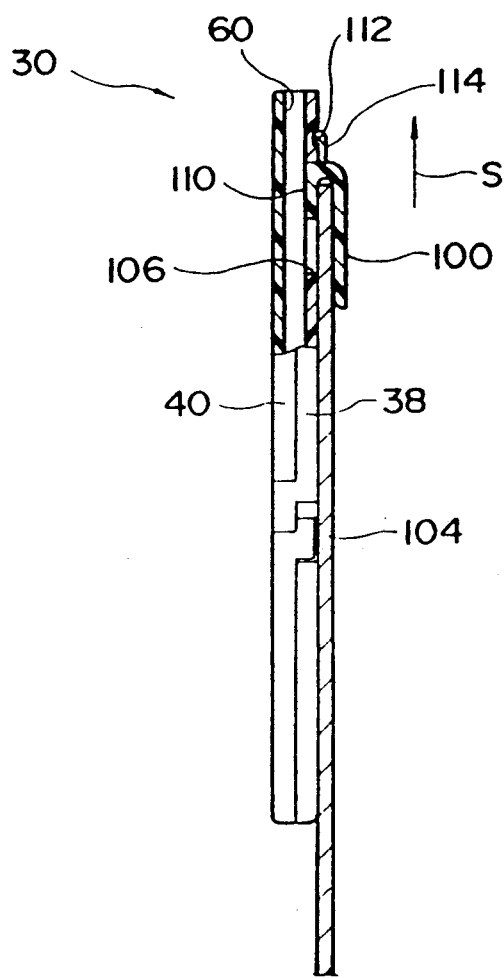
Figure 15:
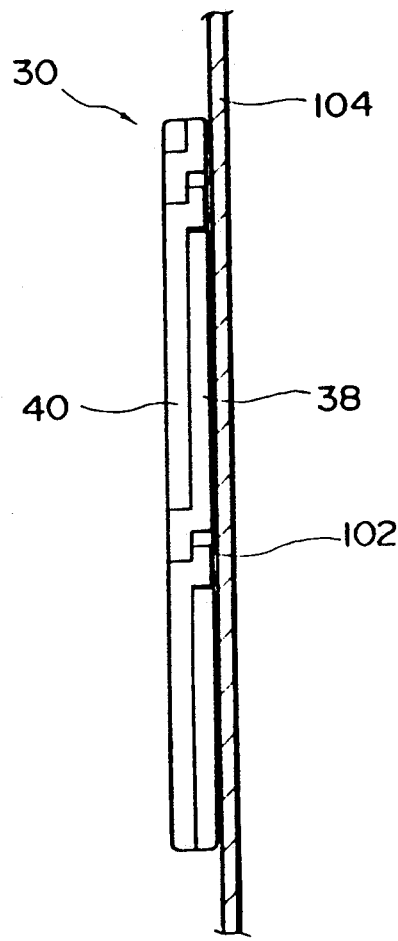

Incidentally, a description has been made in the case where the mounting slot 36 is defined in the horizontal wall 32 so as to insert the case body of the card case 30 therein, thereby attaching the card case 30 to the horizontal wall 32 in the above-described embodiment. As an alternative, as shown in FIG. 13, the card case 30 may be mounted on a vertical wall 104 by clips 100 or adhesive tape 102 as shown in FIGS. 14 and 15 with each clip 100 detachably mounted on the case body of the card case 30. In this case, each adhesive tape 102 is applied on the vertical wall 104 in the state in which each clip 100 is taken out from the case body thereof as shown in FIG. 15. Thus, the application of the adhesive tape 102 thereon is effective in mounting the card case 30 on the intermediate portion of the vertical wall 104. In addition, the clip 100 is so constructed that the vertical wall 104 is interposed between the case body and the clip 100 in the state in which it is mounted on the case body thereof, as shown in FIG. 14. This construction is effective for mounting the card case 30 on an edge such as an upper edge of the vertical wall 104. Incidentally, when it is desired to mount the clip 100 on the case body, the clip 100 is slidably moved in the direction indicated by the arrow S after insertion of the same into each of mounting slots 106 defined in the case body. As a consequence, hooks 110 are held in engagement with their corresponding vertically-extending portions 108 (shown in FIG. 13) which extend out in an opposing relationship to inner peripheral walls of the respective mounting slots 106. In addition, engagement members 114 are fitted in their corresponding grooves 112 defined in peripheral edge portions of the mounting slots 106 of the case body, thereby making it possible to fix the respective clips 100 to the case body. On the other hand, when it is desired to take out the clips 100 from the case body, they are released from their corresponding mounting slots 106 by performing the work opposite to the above assembling work, i.e., the deassembling work.

Figure 16:
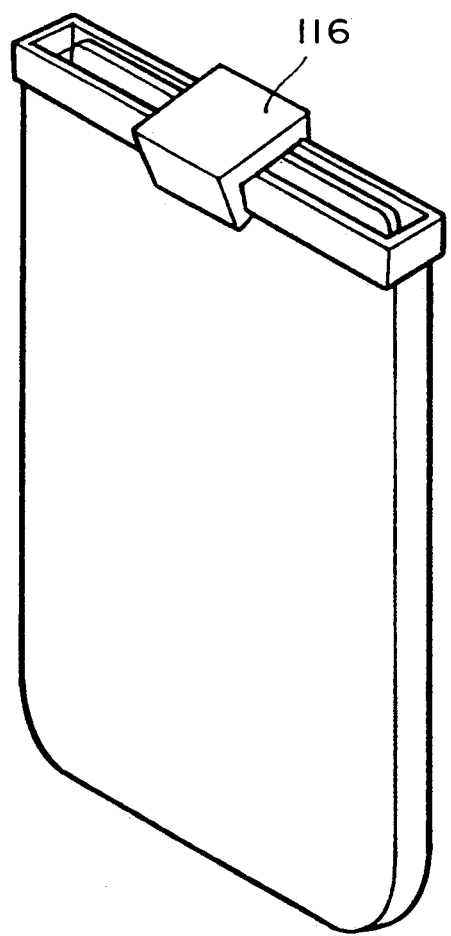
FIG. 16 is a perspective view showing one example of a cover 116.
Figure 17:
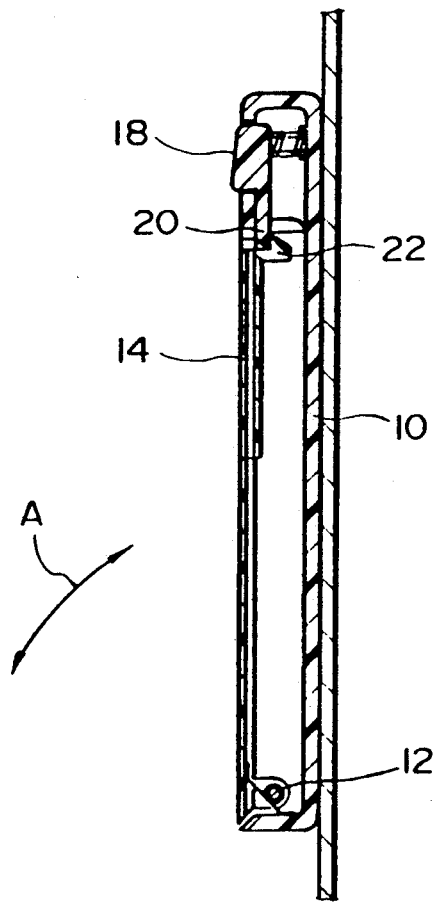
Figure 18:
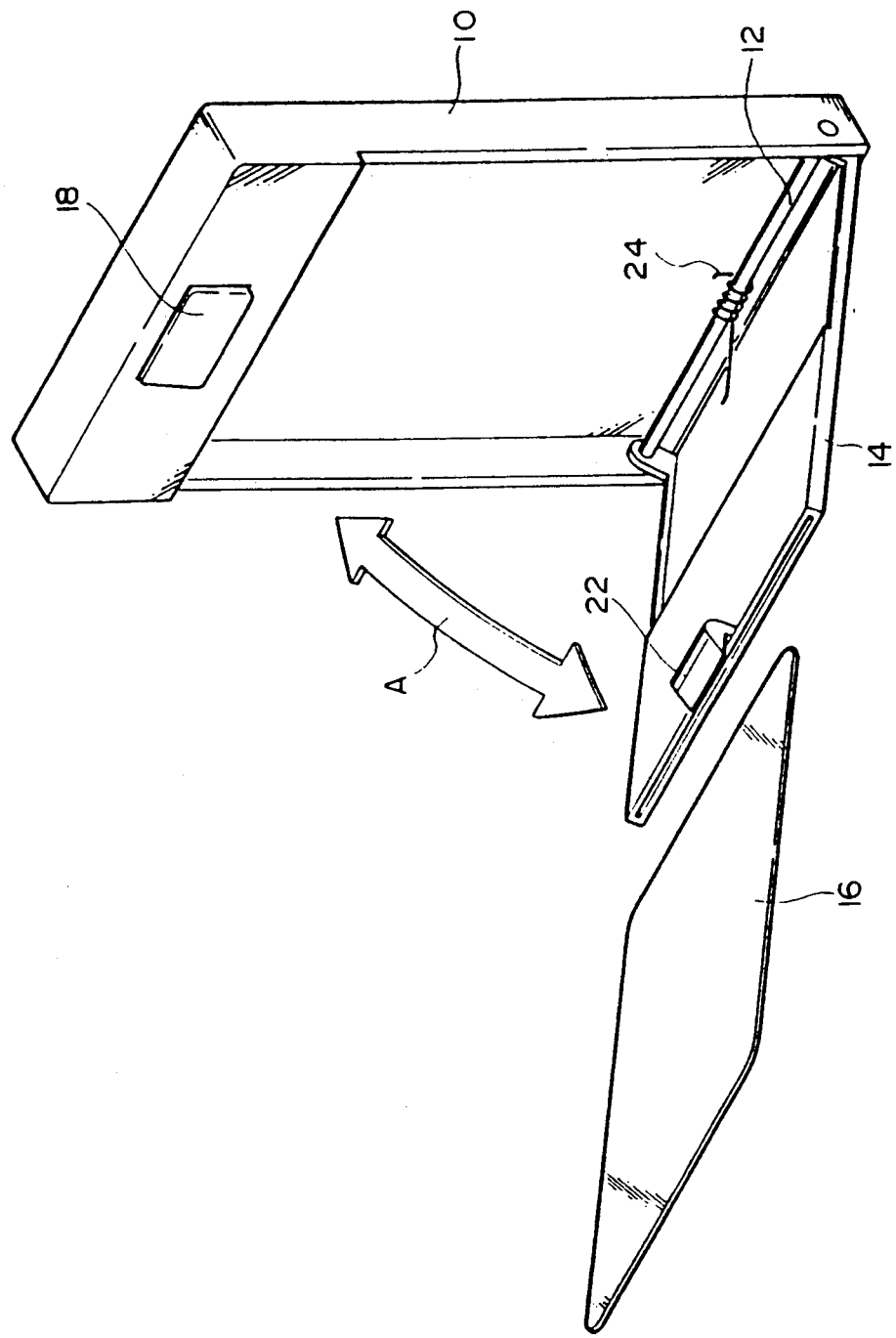

As shown in FIG. 16, a cover 116 for covering all or a part of an opening of the card case 30 may be mounted to prevent the fuel card 34 from emerging from the opening thereof in the above-described embodiment.

In addition, a description has been made in the case where the card case 30 is mounted on the horizontal wall 32 or the vertical wall 104 provided in the interior of the automobile so as to be used for the accommodation of the fuel card 34 in the above-described embodiment. However, needless to say, the card case 30 may be mounted on an attache case or the like or the user may put the card case 30 in his pocket to be used as a portable one. The card case 30 may of course be used for the accommodation of cards such as cash cards issued by a bank.

In the above-described embodiment, the latch cam 84 is used to interlock the holder 66 with the case body at the fuel-card accommodating position and to release the holder 66 from being interlocked with the base body by forcing the holder 66 into the same. However, as an alternative, a heart cam may be used to hold the holder 66 in the case body at the fuel-card accommodating position and to release the holder 66 from being held in engagement with the case body by forcing the holder 66 into the same.

In addition, a description has been made in the case where one fuel card is accommodated in the card case. However, the card case may of course be used for the accommodation of a plurality of fuel cards.

As has been described above, the card case according to the present invention has a superb effect that cards such as fuel cards, etc. can be simply inserted therein and/or pulled out thereof.

Having how fully described the invention, it will be apparent to those skilled in the art that many changes and modifications can be made without departing from the spirit or scope of the invention as set forth herein.

What is claimed is:

1. A card holder comprising:
   card accommodating means for inserting a card therein and accommodating the same therein;
   card moving means capable of moving the card between a card accommodating position where the card is locked and a card non-accommodating position where the card is attached to said card moving means in said card accommodating means;
   urging means for urging said card moving means toward said card non-accommodating position;
   locking means for locking said card moving means in a locked state at said card accommodating position when said card is pressed against an urging force produced by said urging means; and
   lock releasing means for releasing the locked state of the card, said lock releasing means being activated by the card being pressed deeper than the card accommodating position.

2. A card holder according to claim 1, wherein said card accommodating means comprises first and second plate-shaped members which are combined together with a predetermined space defined therebetween, said card accommodating means having one end thereof formed with a card insertion slot defined therethrough.

3. A card holder according to claim 2, wherein said card moving means is disposed in the predetermined space and has card movement preventing means, activated by forcing the card therein, for preventing said card from being moved in a direction transverse to both a card insertion direction and a card thickness direction.

4. A card holder according to claim 1, wherein said urging means is provided between said card accommodating means and said card moving means.

5. A card holder according to claim 2, wherein said locking means comprises a protrusion member of said card moving means, a hooking member mounted on one of said first and second plate-shaped members in said card accommodating means so as to be swingable in the card thickness direction and a latch member provided between said protrusion member of said card moving means and said hooking member so as to be slidable in the directions in which the card is to be inserted and/or pulled out.

6. A card holder according to claim 5, wherein said lock releasing means includes a raised portion formed on said latch member, said lock releasing means being activated when said card is forced into a position deeper than the card accommodating position, said hooking member mounted on one of said first and second plate-shaped members being moved under pressure from said raised portion in a direction in which said card moving means is unlocked, thereby unlocking said hooking member from said protrusion member of said card moving means and said latch member.

7. A card holder according to claim 1, further comprising means for mounting said card holder on a mounting frame and means for covering an opening defined therethrough.

8. A card holder according to claim 1, wherein said card accommodating means includes a first and a second plate-shaped member combined into a single unit so as to cover side portions and a bottom portion thereof except for a card insertion slot.

9. A card holder comprising:
- a card accommodating member comprised of a first and a second plate-shaped member combined into a single unit with a predetermined space defined therebetween, said card accommodating member having at one end thereof a card insertion slot defined therethrough;
- a card moving member capable of moving a card between a card non-accommodating position where the card is attached to said card moving member and a card accommodating position where the card is locked in said card accommodating member;
- an urging member for urging said card moving member in a card pulling-out direction;
- locking means comprising a block-shaped portion connected to said card moving member, a hooking member formed in a flexible member mounted on one of said first and second plate-shaped members of said card accommodating member so as to be swingable in a direction of thickness of said plate-shaped members and a latch member provided between said block-shaped portion and said hooking member so as to be slidable in a card insertion direction and in the card pulling-out direction, said locking means for locking said card moving member at said card accommodating position against an urging force of said urging member; and
- lock releasing means for unlocking said card moving member when the card is forced into a position deeper than the card accommodating position, said lock releasing means comprising a raised portion mounted on said latch member for unlocking said card moving member by moving said hooking member under pressure of said raised portion of said latch member, thereby unlocking said hooking member from said block-shaped portion and said latch member.

10. A card holder according to claim 9, wherein said first and second plate-shaped members of said card accommodating member have hooks and recesses respectively, arranged such that when said first and second plate-shaped members are combined into a single unit, the hooks formed in each of said two plate-shaped members are held in engagement with the recesses formed in the other one thereof respectively, said first plate-shaped member having a guide groove for slidably fitting said block-shaped portion connected to said card moving member therein so that said block-shaped portion is slideable in the card insertion direction from an intermediate portion of said first plate-shaped member to a bottom thereof.

11. A card holder according to claim 9, wherein said card moving member prevents the card from being moved in a transverse direction, the transverse direction being at right angles to the card insertion direction and the directions of the thickness of said plate-shaped members when said card moving member is brought into contact with the card.

12. A card holder according to claim 9, wherein said card moving member comprises two legs formed in opposite ends of said card moving member, said two legs being brought into contact with the card and wherein said block-shaped member is connected to said card moving member so as to be projected from an intermediate portion between said two legs in the card insertion direction.

13. A card holder according to claim 9, wherein said locking means is activated by when said bock-shaped portion is first brought into contact with a lower end portion said card accommodating member by pressing the card in the card insertion direction, and then said block-shaped portion is next moved in the card pulling-out direction by the urging force of said urging member, so as to lock the card at the card accommodating position.

14. A card holder according to claim 9, wherein said lock releasing means is activated when the card is pressed against the urging force of said urging member while said locking means is activated so as to being said raised portion mounted on said latch member into contact with a lower end portion of said hooking member mounted on the one of said first and second plate-shaped members of said card accommodating member, the hooking member being moved to permit said block-shaped portion to move in the card pulling-out direction by the urging force of said urging member, thereby unlocking said card moving member.

15. A card holder according to claim 9, wherein one of said first and second plate-shaped members of said card accommodating member is provided with mounting means releaseably engageable to a member on which the card holder is to be mounted.

16. A card holder comprising:
- a card case body including first and second plate-shaped members combined into a single unit with a predetermined space defined therebetween, said card case body having one end thereof provided with a card insertion slot defined therethrough and having flanges formed on a peripheral edge portion of the card insertion slot and hooks formed on surfaces of the first and second plate-shaped members in their thickness directions, said card case body further having a guide groove for slidably fitting a card holding member therein over an area ranging from a card insertion direction intermediate portion of one of said first plate-shaped member and said second plate-shaped member to a bottom thereof;
- the card holding member including a holder brought into contact with the insertion end of a card and a leg positioned at each end of the holder, whereby said card is held by said legs when said card is brought into contact with said card holding member;

compression coil springs provided between said card case body and a bottom of said card holding member for urging said card holding member in a card pulling-out direction;

locking means including a hook and a latch, said locking means being activated when said card is pressed in the card insertion direction to bring a block-shaped portion, formed so as to project from an intermediate portion between the legs in the card insertion direction, into contact with said latch and to hold said latch in engagement with said hook and to bring said block-shaped portion into contact with a lower end portion of said card case body, so that when said block-shaped portion is moved in the card pulling-out direction by an urging force of said compression coil springs, said block-shaped portion is held in engagement with said latch and with said hook so as to lock said card at a card accommodating position; and lock releasing means including a raised portion on said latch, said lock releasing means being activated when said card is pressed against the urging force of said compression coil springs from the card accommodating position where said card is locked to bring said block-shaped portion into contact with the lower end portion of said card case boy, so that when the card is moved in the card pulling-out direction by the urging force of said compression coil springs, said block-shaped portion is held in engagement with said latch to cause said hook to slide from said latch to said block-shaped portion, thereby releasing said card from being locked.

17. A card holder according to claim 16, wherein said card holding member further includes protrusions formed so that said card can be held by a resilient force of said legs pressed in a transverse direction when said card is brought into contact with said card holding member, and presser shafts protruded from tip portions of said protrusions in such a manner as to restrict a movement of said card in a direction of a thickness of said card when said card is inserted.

18. A card holder according to claim 16, wherein said locking means is activated when said card is pressed in the card insertion direction to bring a triangle-shaped protrusion mounted on said block-shaped portion into contact with a triangular groove of said latch and to hold engagement grooves of said latch in engagement with a stepped portion of said hook, so that when said block-shaped portion reaches the lower end portion of said card case body and thereafter when said block-shaped portion is moved in the card pulling-out direction by the urging force of said compression coil springs, a stepped portion of said block-shaped portion is maintained in engagement with an upper end portion of said latch and said stepped portion of said hook is brought into engagement with said stepped portion of said block-shaped portion, thus locking said card at the card accommodating position.

19. A card holder according to claim 18, wherein said lock releasing means is activated when said card is pressed against the urging force of said compression coil springs while said locking means is activated so as to press a slanted surface of said hook with said raised portion of said latch to thereby move said hook in a direction of a thickness of said card and cause said block-shaped portion to reach the lower end portion of said card case body, and thereafter when said card is moved in the card pulling-out direction by the urging force of said compression coil springs, upper end portions of said engagement grooves of said latch are held in engagement with said stepped portion of said block-shaped portion to cause the hook to slide from said legs of said latch onto said stepped portion of the block-shaped portion, thus releasing said card from being locked.

20. A card holder according to claim 7, wherein the mounting frame comprises an automobile.

* * * * *